United States Patent
Selvaraj et al.

(10) Patent No.: US 10,884,879 B2
(45) Date of Patent: Jan. 5, 2021

(54) METHOD AND SYSTEM FOR COMPUTING A QUORUM FOR TWO NODE NON-SHARED STORAGE CONVERGED ARCHITECTURE

(71) Applicant: ORACLE INTERNATIONAL CORPORATION, Redwood Shores, CA (US)

(72) Inventors: Santhosh Selvaraj, Fremont, CA (US); Prasad V. Bagal, Saratoga, CA (US); Kanchan Ramesh Matkar, Redwood City, CA (US); Sanuj Basu, Foster City, CA (US)

(73) Assignee: Oracle International Corporation, Redwood Shores (CA)

( * ) Notice: Subject to any disclaimer, the term of this patent is extended or adjusted under 35 U.S.C. 154(b) by 119 days.

(21) Appl. No.: 16/164,679

(22) Filed: Oct. 18, 2018

(65) Prior Publication Data

US 2020/0125460 A1 Apr. 23, 2020

(51) Int. Cl.
| | | |
|---|---|---|
| G06F 11/00 | (2006.01) | |
| G06F 11/18 | (2006.01) | |
| G06F 11/20 | (2006.01) | |
| G06F 3/06 | (2006.01) | |

(52) U.S. Cl.
CPC .......... *G06F 11/187* (2013.01); *G06F 3/067* (2013.01); *G06F 3/0614* (2013.01); *G06F 3/0634* (2013.01); *G06F 3/0635* (2013.01); *G06F 11/2033* (2013.01); *G06F 11/2038* (2013.01); *G06F 11/2048* (2013.01); *G06F 11/2097* (2013.01)

(58) Field of Classification Search
CPC .... G06F 11/187; G06F 3/0614; G06F 3/0634; G06F 3/0635; G06F 3/067
See application file for complete search history.

(56) References Cited

U.S. PATENT DOCUMENTS

| | | | |
|---|---|---|---|
| 5,828,889 A | 10/1998 | Moiin et al. | |
| 7,249,150 B1 * | 7/2007 | Watanabe | ........... G06F 11/1471 |
| 7,680,837 B2 * | 3/2010 | Yamato | ............... G06F 12/0246 707/821 |
| 7,739,677 B1 | 6/2010 | Kekre | |
| 7,814,064 B2 * | 10/2010 | Vingralek | ............. G06F 3/0617 707/674 |
| 8,327,186 B2 * | 12/2012 | Coatney | .............. G06F 11/2033 714/6.3 |
| 8,484,510 B2 * | 7/2013 | Shankar | .............. G06F 11/0709 714/13 |
| 8,498,967 B1 | 7/2013 | Chatterjee | |
| 8,595,546 B2 | 11/2013 | Dalton | |
| 8,671,218 B2 * | 3/2014 | Hisgen | ................ G06F 11/0709 709/237 |
| 8,806,264 B2 | 8/2014 | Kampouris | |
| 8,856,593 B2 | 10/2014 | Eckhardt et al. | |

(Continued)

OTHER PUBLICATIONS

Burke, J, et al "Split-Brain Consensus" Dec. 2014, Semantic Scholar.

(Continued)

*Primary Examiner* — Esaw T Abraham
(74) *Attorney, Agent, or Firm* — Vista IP Law Group, LLP

(57) ABSTRACT

Described is an approach for computing a quorum for a two-node non-shared storage converged architecture via a distributed state machine without the need for a quorum device.

27 Claims, 12 Drawing Sheets

(56) References Cited

U.S. PATENT DOCUMENTS

| | | |
|---|---|---|
| 8,904,117 B1 | 12/2014 | Kalekar et al. |
| 9,063,787 B2 | 6/2015 | Lee et al. |
| 9,396,076 B2 | 7/2016 | Veiga et al. |
| 9,692,645 B2 * | 6/2017 | Banka ................... G06F 3/0617 |
| 9,836,366 B2 * | 12/2017 | Schatz ................ G06F 11/2033 |
| 9,852,034 B2 * | 12/2017 | Akirav ................ G06F 11/1423 |
| 9,930,140 B2 * | 3/2018 | Hockett ................ H04L 67/322 |
| 10,511,694 B2 * | 12/2019 | Goyal .................... H04L 67/16 |
| 2009/0177914 A1 | 7/2009 | Winchell |

OTHER PUBLICATIONS

Xuemin Lin, "A fully distributed quorum consensus method with high fault-tolerance and low communication overhead" Oct. 1997, Theoretical Computer science, vol. 185, Issue 2, pp. 259-275.

\* cited by examiner

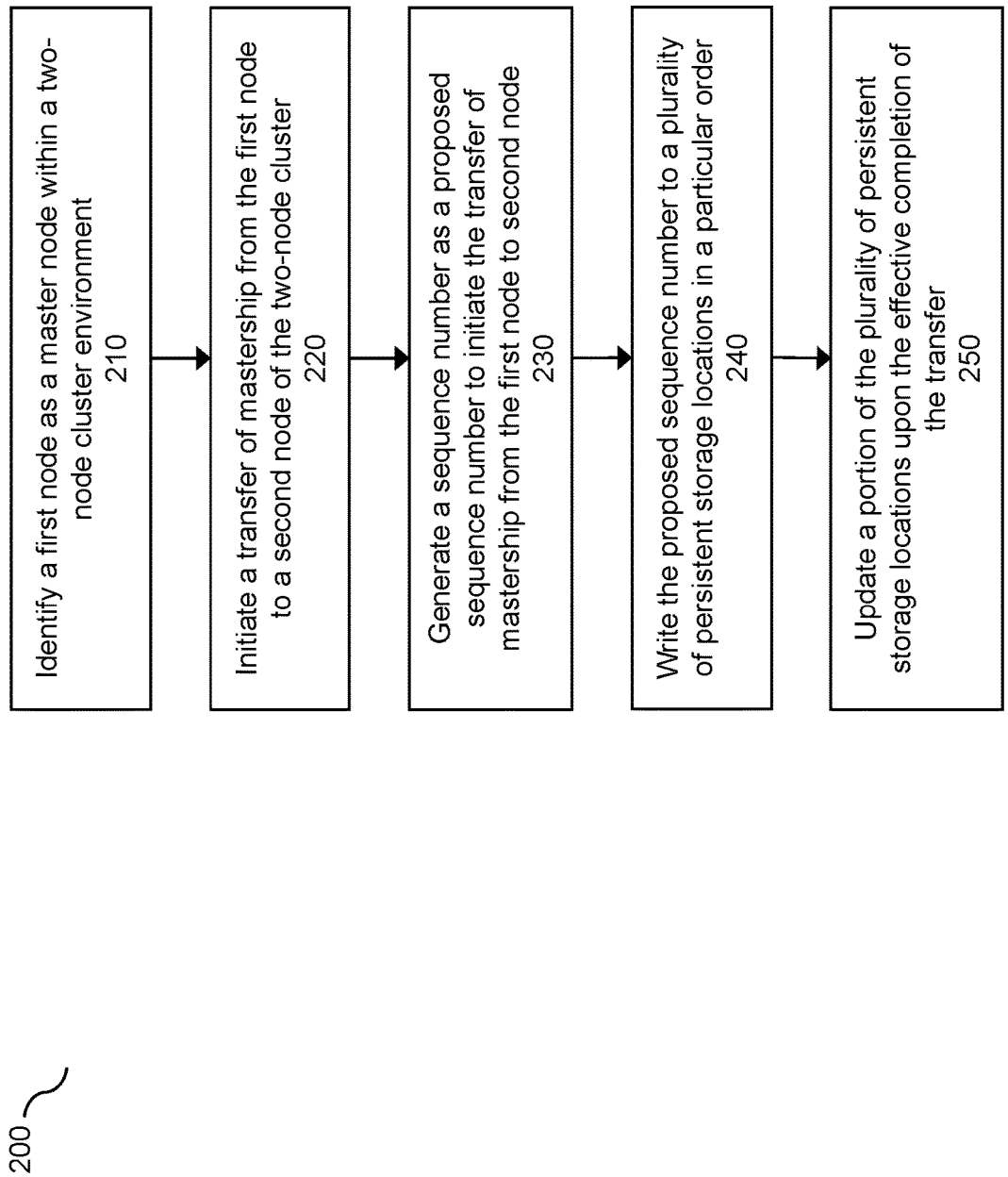

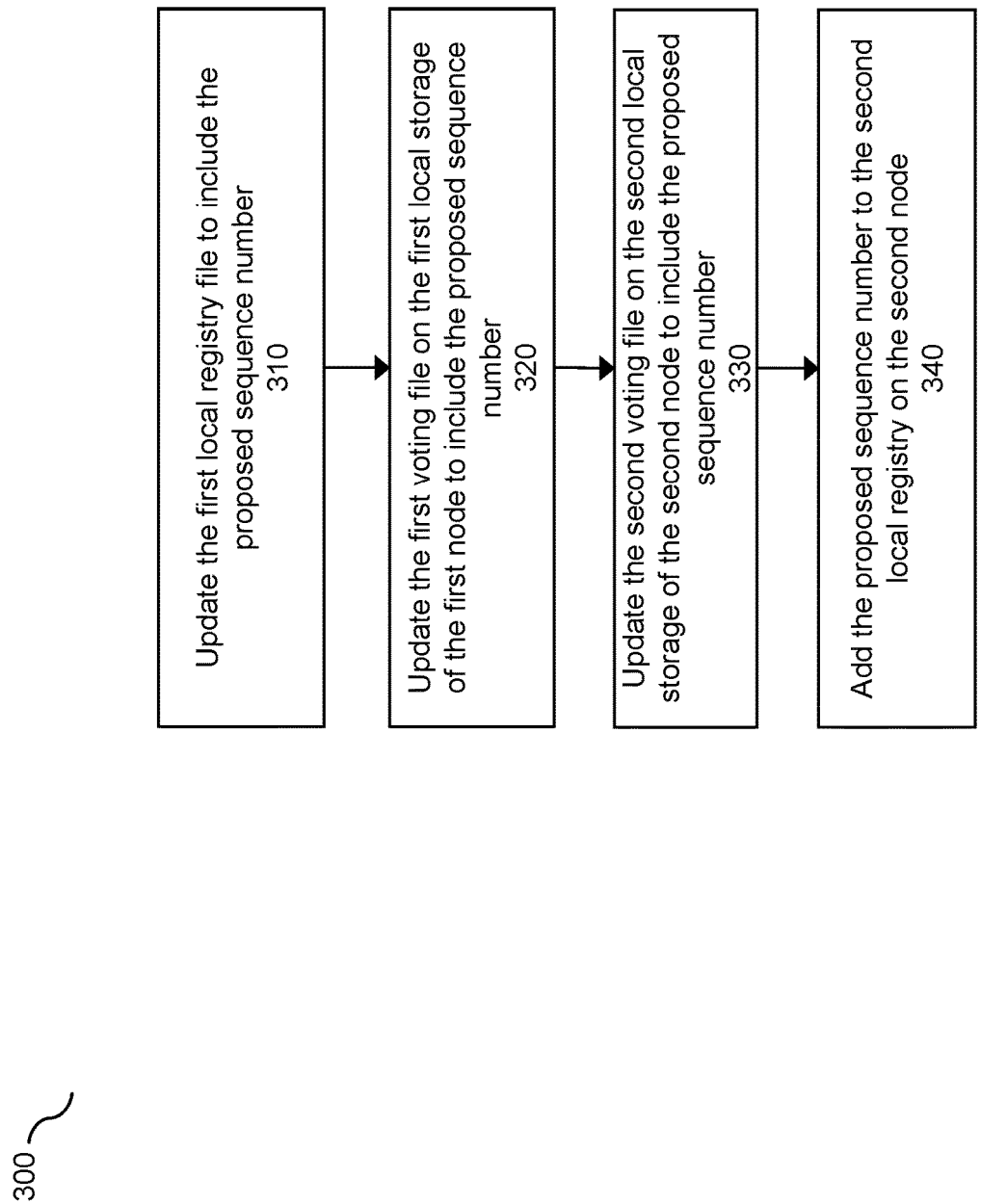

METHOD AND SYSTEM FOR COMPUTING A QUORUM FOR TWO NODE NON-SHARED STORAGE CONVERGED ARCHITECTURE

FIELD

This disclosure concerns a method, a computer program product, and a computer system for computing a quorum for a two-node non-shared storage converged architecture without the need for a quorum device via a distributed state machine.

BACKGROUND

Legacy multi-node computing clusters in a converged architecture generally utilize shared storage and/or quorum consensus devices to determine which node is a master node so that multi-node computing clusters may continue operating after a problem occurs, or during a complete cluster failure to determine which node to restart the cluster. A converged architecture operates by grouping multiple information technology components into a single, optimized computing package. Components of a converged architecture may include servers/nodes, data storage devices, networking equipment and software for IT infrastructure management, automation, and orchestration.

A quorum device is a shared storage device and/or quorum server that (1) is shared by two or more nodes and (2) contributes votes that are used to establish a quorum to manage the general state of the cluster. The quorum device (s) often serve as tiebreakers when determining whether the cluster is healthy or not or whether a particular node is a master or not. A cluster may operate only when a quorum of votes is available. Both cluster nodes and quorum devices vote to form a quorum. By default, cluster nodes acquire a quorum vote count of one when they boot and become cluster members. Quorum devices acquire quorum vote counts that are based on the number of node connections to the quorum device. When a quorum device is set up, it acquires a maximum vote count of N−1 where N is the number of connected votes to the quorum device. For example, a quorum device that is connected to two nodes with nonzero vote counts has a quorum count of one (two minus one). When a two-node cluster goes down (e.g., fails) without a quorum device, there is no tiebreaker (e.g., the quorum device) to determine which node of the two-node cluster should be the master node to restart the cluster to ensure data integrity is maintained in the cluster. However, implementing a quorum device with each cluster introduces additional financial and technical costs and complexity to managing the cluster, especially when the cluster is only a two-node non-shared storage cluster.

Recently, with the advent of different types of local storage that may be directly attached to or operatively coupled to nodes, users are able to easily deploy nodes using new types of local storages as non-shared storage devices in a two-node cluster arrangement. For example, different types of local storages may include non-volatile memory (NVM) which is often NAND flash memory that comes in several physical form factors, including solid-state drives (SSDs), PCI Express (PCIe) add in cards and other forms such as M.2 cards. NAND flash memory is a type of nonvolatile storage technology that does not require power to retain data. An important goal of NAND flash development has been to reduce the cost per bit and to increase maximum chip capacity so that flash memory can compete with magnetic storage devices, such as traditional hard disks. NVM Express (NVMe), as a logical device interface, has been designed to capitalize on the low latency and internal parallelism of solid-state storage devices. Thus, many legacy users deploy a large number of two node clusters (e.g., hundreds and thousands of two node clusters) where the users simply want redundancy in their nodes for failover purposes without incurring additional costs associated with installing and managing quorum devices and/or shared disk management functionalities for managing each of the two node clusters.

When implementing a two-node cluster, it is often undesirable to include a tiebreaker node since there are disadvantages when including such a tiebreaker (e.g., a quorum device). The disadvantages are associated with resource availability. For example, when a user is provisioning a two-node cluster in a cloud implementation, the user may only want to deploy a two-node cluster without having to include a shared disk/shared database and/or a quorum device for managing the two-node cluster and/or the shared disk and/or shared database. The user may not want to pay for or manage a complex cluster infrastructure to just manage a two-node cluster. If the user plans to deploy, as an example, one thousand two-node clusters having non-shared storage, including one thousand shared databases and/or one thousand quorum devices may be a huge financial and infrastructure management burden for the user's organization.

However, failure to include a tiebreaker may also cause its own sets of problems. In a two-node cluster with non-shared storage, the absence of a quorum server or a quorum device may result in a non-deterministic, split-brain resolution during failure situations of either or both nodes. For example, the two nodes may both end up surviving independent crashes, which may result in corruption of data.

Therefore, there is a need for a method and/or system for computing a quorum for a two-node non-shared storage converged architecture without the need for a quorum device.

SUMMARY

According to some embodiments, described are improved systems, computer program products, and methods for determining a quorum in a two node non-shared storage cluster via a distributed state machine without the need for a quorum device and/or quorum server.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings). The invention will be described and explained with additional specificity and detail through the use of the accompanying drawings in which:

FIG. 2 shows a high-level flowchart of an approach to implement some embodiments of the present disclosure.

FIG. 3 illustrates a flowchart to write a proposed sequence number to a plurality of persistent storage locations in a particular order, according to some embodiments of the present disclosure.

DETAILED DESCRIPTION

Figure 1:
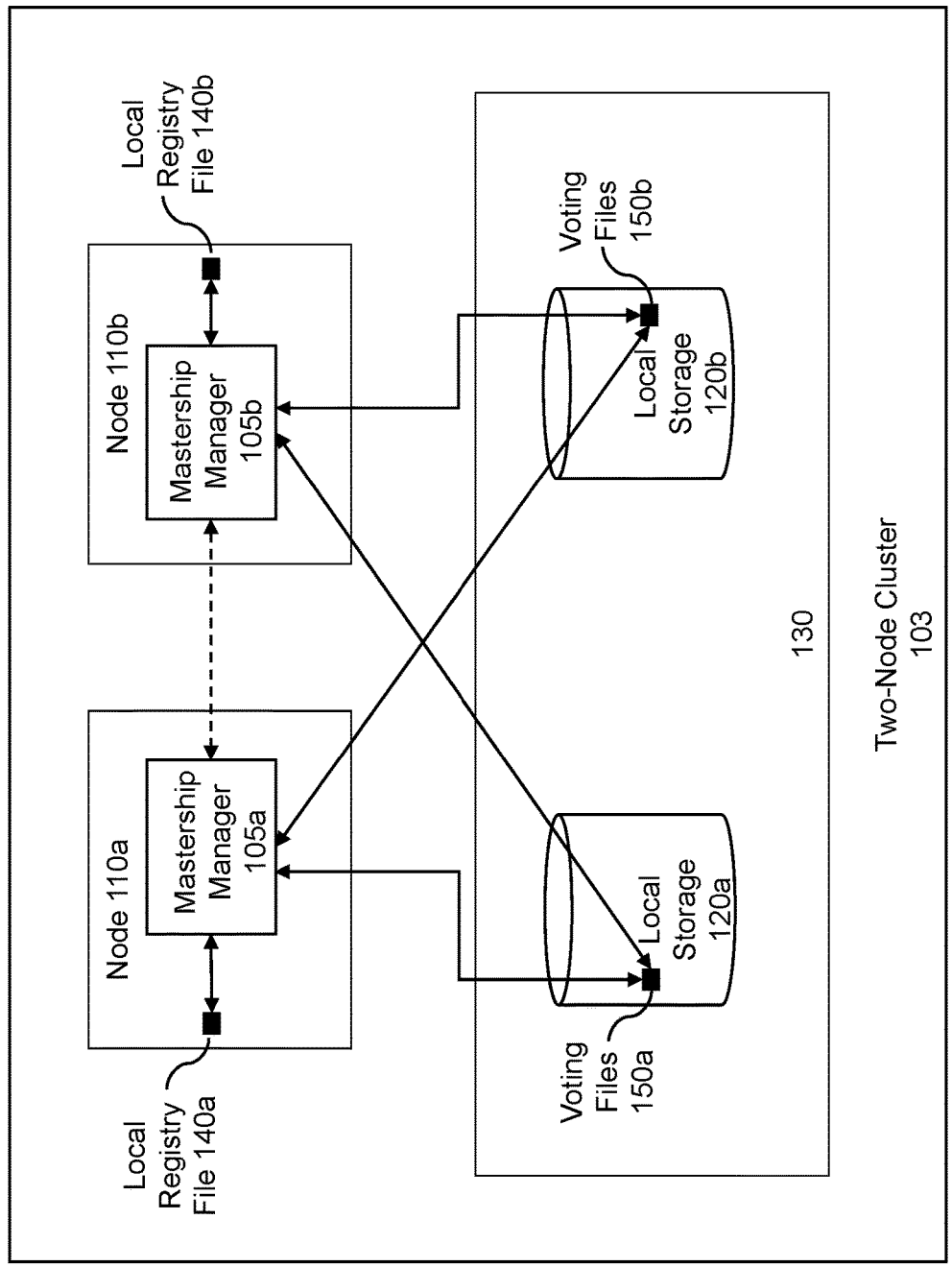
FIG. 1 illustrates a two-node non-shared storage converged architecture, according to some embodiments of the present disclosure.

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The present disclosure provides an improved approach for computing a quorum for a two-node non-shared storage converged architecture, hereinafter referred to as a "two-node cluster", without the use of a quorum device and/or tiebreaker. The non-shared storage may be non-shared databases, but logically shared through each respective node. In particular, the approach leverages a state management process for determining which node of the two-node cluster is a master node so that if the cluster fails and needs to be restarted, the master node may be determined based on this state management process. The approach provides a protocol for a planned transfer of mastership such that the participating nodes can confirm whether the re-mastership has been completed or whether the re-mastering was in progress when the cluster failed. In either case, based on the disclosed approach, the participating nodes, upon restart after a cluster failure, may be able to deterministically determine which node is the master node to restart the cluster, regardless of the whether the transfer in mastership completed successfully or failed during the re-mastering process.

The state management process writes values identifying which node is the master node in different persistent storage locations so that when the system fails and the two nodes are coming back online, each node of the two nodes can inspect the various different persistent storage locations that they have access to and based on the values that are stored in the different persistent storage locations, each node can figure out who is the master node deterministically. Furthermore, during a re-mastering process, where mastership of the master node is transferred to the non-master node, new values are written to the different persistent storage locations in a particular order so that even in the event of a cluster failure, e.g., where both nodes fail, in the middle of the re-mastering process, each node, upon startup, may inspect the various different persistent storage locations that they have access to and based on the values that are stored in the different persistent storage locations, each node can figure out which node is the master node deterministically so that the master node may restart the cluster.

For example, during normal operations, a current sequence number (discussed further below) can be found in three of the four persistent storage locations (e.g., local registry file 140a and voting file 150a of the master node and voting file 150b of the non-master node, as discussed further below). During a re-mastering process, a new monotonically increasing sequence number is generated (e.g., a proposed sequence number, discussed further below) and stored in the plurality of persistent storage locations to manage the state of mastership in a particular and predefined sequence of steps. If the re-mastering process completes before a total failure of the cluster (e.g., before both nodes fail), then each node, upon restart, may deterministically determine who is the master node. However, if failure of the cluster occurs in the middle of the re-mastering process, as an example, each node upon their restart, may still be able to deterministically determine which node is the master node; simply by inspecting the plurality of persistent storage locations that each node has access to inspect, and in certain situations, in combination with a predefined timeout variable (discussed further below).

Although the state management process may be able to help determine which node is the master node during most failure scenarios, there are certain scenarios which may require manual intervention to properly restart the cluster. For example, in some embodiments, the master node may fail before a re-mastering process may be initiated (e.g., if someone accidentally unplugs a power cable of the master node and immediately shuts down the master node before a re-mastering process may be initiated by either the master node or the non-master node), a manual restart of the cluster may be required.

The state management process is maintained by first identifying a node from the two nodes in the two-node cluster as the master node the first time the two-node cluster is initialized (e.g., started, formed). When mastership needs to be transferred from the master node to the non-master node, a monotonically increasing sequence number is written into a plurality of persistent storage locations in a pre-defined sequence across the two-node cluster during the transfer in order to keep track of the transfer process in case the cluster fails in the middle of the change of mastership (e.g., re-mastering). By managing the state of the cluster in this manner, each node of the two-node cluster may determine whether it is the master node or non-master node when each node comes back online based upon at least each node inspecting the plurality of storage locations that it has access to in order to determine whether it is the master node or not. This is important because during a cluster restart, only the master node is allowed to restart the cluster. The non-master node cannot restart the cluster. Instead, the non-master node may only join/rejoin the cluster once the master node has restarted the cluster. Determining the master node to restart the cluster is an important process to ensure storage data among the cluster is maintained and not corrupted as a result of a cluster failure.

With the availability of cloud computing, converged architectures are very attractive to users because users may simply (a) provision servers having local storages attached to the servers and (b) connect the servers together without any additional infrastructures such as, for example, a shared database and/or quorum device(s) for operating and managing the cluster of nodes and storage devices. As discussed above, a converged architecture operates by grouping multiple information technology components into a single, optimized computing package. Components of a converged architecture may include servers/nodes, data storage devices, networking equipment and software for IT infrastructure management, automation, and orchestration. Many users are looking to form two-node converged clusters with non-shared local storages to provide fail-safe/fault tolerant across the two-node cluster without having to add on additional infrastructures typically required for managing multi-node clusters.

The approach disclosed herein improves the technological area of cluster management for two-node non-shared storage converged architectures because the present disclosure provides the ability to compute a quorum for a two node non-shared storage converged architecture by using a distributed state machine without the need for a quorum device and/or quorum server. Not having a quorum device included in the system to determine a quorum greatly reduces the amount of cluster management complexities and costs associated with a two-node cluster. In some embodiments, a user's computing infrastructure may include hundreds and/or thousands of two node non-shared storage converged architectures (e.g., a two-node cluster). In these embodiments, not having a third system/component (e.g., quorum device, quorum server, or a tiebreaker) to manage a quorum greatly reduces the complexities associated with systems management as well financial costs overall associated to technical equipment, software, and human resources for managing the two-node clusters.

FIG. 1 illustrates a two-node non-shared storage converged architecture for computing a quorum for the cluster without a quorum device, according to some embodiments of the present disclosure. System 100 includes a two-node cluster 103 wherein the two-node cluster includes at least a first node 110a, a second node 110b, a first local storage 120a, and a second local storage 120b, wherein the first local storage 120a and the second local storage 120b together represents a non-shared storage 130.

Nodes 110 are servers. The first node 110a includes a mastership manager 105a and a local registry file 140a that stores state information for managing the state of the cluster. The mastership managers 105 manage the state of mastership of the two-node cluster 103 by ensuring that at any point in time, a master node may be determined by either the first node 110a or the second node 110b. The mastership managers 105 may constantly keep track of each node 110's health via, as an example, heartbeat monitoring and node resource utilization statistics. If it is determined that the master node may be taken offline (e.g., a planned maintenance outage or an unplanned system failure), the mastership managers 105 will work together to transfer mastership from the master node to the non-master node by writing to a plurality of persistent storage locations (e.g., local registry files 140 and voting files 150 discussed below) within the two-node cluster 103.

The local registry file 140a is a persistent storage location on the first node 110a used to at least hold sequence number(s) as discussed in more detail below. The local registry file 140a is managed by the local file system of the first node 110a. The local registry file 140a is not network accessible and thus the mastership manager 105b on the second node 110b cannot access the local registry file 140a over the network. The local registry file 140b is managed by the local file system of the second node 110b. The local registry file 140b is not network accessible and thus the master manager 105a on the first node 110a cannot access the local registry file 140b over the network.

State information stored in the plurality of persistent storage locations may include a current committed sequence number and/or a proposed sequence number. The sequence numbers (e.g., the current committed sequence number and the proposed sequence number) are monotonically increasing numbers that are generated. The sequence number may be associated to a specific state of the system (e.g., currently committed or proposed). A change in sequence number takes place whenever a change in mastership of the nodes is initiated and completed. A local registry file 140 on a node having only one sequence number may indicate that the node may be a master node. However, a local registry file 140 of a particular node having no sequence numbers may indicate that the particular node is the non-master node. More disclosures about the relationship of the one or more sequence numbers stored in a local registry file 140 of a particular node at any moment in time to determine whether the node is a master node is discussed below.

Local storages 120 are storage media/devices connected to nodes 110 via, as an example, iSCSI devices and accessible over the network to the other nodes. For example, first node 110a may be configured with one or more local storage directly attached to and/or operatively coupled with, the first node 110a. The one or more local storage, attached to the first node 110a, correspond to first local storage 120a. First local storage 120a may include a voting file 150 wherein the voting file 150 is a block in the local storage 120 that comprise heartbeats (e.g., status information of the nodes) and information indicating the current state of the system. The information indicating the current state of the system may either be a current sequence number or a proposal that includes both the current sequence number and a proposed sequence number, wherein the proposed sequence number is a greater number than the current sequence number.

A proposal may be a combination of two sequence numbers (e.g., a current sequence number "Sc" and a proposed sequence number "Sp"). A proposal indicates a start of a state transition, a re-mastering of the master node from a first node to a second node, or a transferring of mastership from a master node to a non-master node, all of which may be used interchangeably hereinafter. In some embodiments, a proposal may be two sequence numbers (e.g., Sc and Sp) stored in consecutive memory locations of a node registry file 140 and/or in a voting file 150. For example, assuming node 110a is currently the master node of the two-node cluster and no state transition has been initiated yet. The first voting file 150a in this example may have a current sequence number Sc without any proposed sequence number Sp. The second voting file 150b may also have the current sequence number Sc without any proposed sequence number Sp and the first local registry file 140a may also have the current sequence number Sc without any proposed sequence number Sp. The second local registry file 140b on the second node 110b will not have any current sequence number Sc and/or proposed sequence number Sp, which indicates that second node 110b is a non-master. In some embodiments, the current and proposed sequence numbers may be designated via a field name designation associated with the value of the respective sequence number.

The plurality of persistent storage locations comprises the local registry file 140a on the first node 110a, the local registry file 140b on the second node 110b, and the first voting file 150a within the first local storage 120a and the second voting file 150b within the second local storage 120b. During normal operations, only a current sequence number Sc is stored in three of the four persistent storage locations, as discussed above. The three out of the four persistent storage locations correspond to a quorum indicating that the first node 110a is currently the master node. During a re-mastering process (e.g., when mastership is being transferred from one node to the other node), a proposed sequence number is introduced into the plurality of persistent storage locations at various steps of the re-mastering process as a proposal. More detailed discussions of how a master node is determined based on the sequence number(s) stored in the plurality of persistent storage locations will be discussed below.

Local storage 120 may be accessible by both nodes of the two-node clusters when both nodes of the two-node clusters are operational and active. However, the local storage 120 associated to a particular node may not be accessible by the other node if the particular node fails and/or is offline. For example, when both nodes 110 are up and running, both local storages 120 are accessible to both nodes 110. However, if the first node 110a has failed, the first local storage 120a is no longer accessible by second node 110b, hence the non-shared aspect of the local storage on the two nodes. The non-shared storage 130 comprises local storage devices 120 directly attached to and/or operatively coupled to respective nodes 110. Although both local storages 120 are non-shared, local storage 120 are accessible by both nodes 110 when both nodes 110 are active and running. Thus, although the local storage 120a and 120b are non-shared, they are logically shared through each respective node 110.

Mastership or assigning a node to be a master node of the two-node cluster occurs in two circumstances. The first circumstance is upon mastering the first time the cluster is formed and the second circumstance is upon re-mastering to change mastership during operation of the cluster. The first circumstance of mastering is performed by the first node to ever come up to form the cluster for the first time. The first node is considered the master node and the second node to come up to join the first node in the cluster the first time the cluster is formed is the non-master node. A user may choose the master node during the initial formation of the cluster. Once the master node forms the cluster, a new sequence number Sc is generated. The Sc is then written or 'keyed' to at least two of the persistent storages (e.g., local registry file 140a and voting file 150a). Once the non-master node joins the cluster, the Sc is written (e.g., keyed) to the voting file 150b to complete the initial mastership setup. The remaining disclosure will focus on the re-mastering process to ensure a master node is always deterministic in the two-node cluster, even after a complete cluster failure/crash during the process of re-mastering.

Re-mastering is the mechanism for transferring mastership from one node to another node. There are many reasons why re-mastering is necessary even in a two-node cluster. For example, a master node may need to be taken offline for maintenance purposes, at which point, the master node may request the non-master node to perform the re-mastering and monitoring of the re-mastering process so that the master node may be taken offline for maintenance purposes. As another example, it may be determined that the master node is beginning to fail, at which point, re-mastering is initiated and managed by either the master node or the non-master node just in case the master node does fail, the two-node cluster would not have to fail as long as the mastership was successfully transferred to the non-master node before the master node fails. In some embodiments, when re-mastering is master driven, the master node may ask the non-master node to perform the re-mastering and monitoring of the re-mastering process.

Additionally, re-mastering may be non-master driven such that a non-master node may initiate and monitor the re-mastering process. For example, if the non-master node determines that the master node may be failing, the non-master node may initiate the re-mastering so that mastership may be transferred to the non-master node in order to prevent the failing of the master node to take down the two-node cluster. The managing of the state of the mastership of the two nodes is based at least in part on the writing of the new sequence number as a proposal to a majority of the plurality of persistent storage locations to initiate and monitor the process of re-mastering to ensure that if there are any issues in the middle of the transfer of the re-mastering process, there will be a process of checking the plurality of persistent storage locations to determine which node of the two-node cluster is the master node that will restart the cluster. This way, a master node may be determined at all times, even during failure of the master node in the middle of the re-mastering process.

The determination of which node is the master node is based at least in part on determining at which point during the re-mastering process the failure took place. For example, if the failure took place early during the re-mastering process, the original master node maintains mastership. And, if failure took place late during the re-mastering process, the original non-master node may be determined to be the master if enough of the re-mastering process has already taken place such that the new proposed sequence number is written to the local registry file (e.g., local registry file 140b) of the original non-master node. However, in the event that a failure took place towards a middle of the re-mastering process, a determination must be further undertaken to determine mastership. More details regarding how a node is determined to be the master node during a failure in the middle of a re-mastering process is discussed below.

In some embodiments, the re-mastering process is managed and monitored by the non-master node. Determining when a re-mastering needs to be started may be determined by either the master node or the non-master node or by a system administrator, or some other third entity. The non-master node may handle the actual managing and monitoring of the re-mastering process. In some embodiments, database transactional activities are paused while the re-mastering process is in progress to ensure that no new transactional data is written to any storage devices that may result in split brain issues or data corruption if the cluster fails in the middle of the re-mastering process.

FIG. 2 shows a high-level flowchart of an approach to implement some embodiments of the present disclosure. Process flow 200 illustrates the steps involved for re-mastering (e.g., transferring mastership from one node to the other node). At 210, a master node may be identified as a first node in a two-node cluster environment. The first node may be the node that originally was designated as the master node with the two-node cluster was formed or created the first time (as discussed above). However, the first node may be the master node by way of a successful re-mastering process that transferred mastership from a second node to the first node. In any case, at any point in time during normal operations of the two-node cluster, one node of the two nodes of the two-node cluster is designated as the master node such that the master node may be easily identifiable.

At 220, a transfer of mastership from the first node to a second node of the two-node cluster may be initiated. The initiation of the mastership transfer may be due to a planned maintenance outage of the first node for, as an example, the purpose of upgrading hardware and/or software. Additionally, the initiation of the mastership transfer may be due to a determination that the first node, currently the master node, may be experiencing some potential issues that may indicate that the first node may fail in the near future, in which case, a transfer of mastership from the first node to the second node may be required to ensure in the event the first node fails, the second node is the master node and may continue to keep the cluster alive so that when the first node is restarted, it may rejoin the cluster.

At 230, a sequence number is generated as a proposed sequence number Sp to initiate the transfer of mastership from the first node to the second node in a two-node non-shared storage cluster. The proposed sequence number Sp is a monotonically increasing number such that the proposed sequence number Sp is a larger number than the current committed sequence number Sc stored in a majority portion of the plurality of persistent storage locations. For example, assuming the master node is node 110a, the majority portion of the plurality of persistent storage locations that may store the current committed sequence number Sc include the local registry file 140a, the first voting file 150a and the second voting file 150b.

At 240, the proposed sequence number Sp, recently generated, is written to a plurality of persistent storage locations in a particular order as a proposal (e.g., Sc and Sp) to track the progress of the transferring of the mastership from a first node to a second node. The details of the particular order of writing the proposed sequence number Sp to the plurality of persistent storage locations is further disclosed in FIG. 3 below.

FIG. 3 illustrates a flowchart to write a proposed sequence number to a plurality of persistent storage locations in a particular order, according to some embodiments of the present disclosure.

At 310, the first local registry file 140a is updated to include the proposed sequence number Sp as well as the current sequence number Sc (e.g., the proposal including both the Sc and Sp). Because this is the first time the proposed sequence number Sp is written, this update of the local registry file 140a indicates that the re-mastering process has been initiated. For example, if the local registry file 140a is inspected at this point in time, the presence of both sequence numbers (e.g., Sc/Sp as a proposal) may indicate that a re-mastering process is underway.

At this point in time, if the master node fails, the re-mastering process fails, or the entire cluster fails, the first node may be determined to be the master node of the cluster because an inspection of the plurality of storage locations can quickly show that the re-mastering process failed very early in its processing since nowhere else in the plurality of storage locations can the proposed sequence number Sp or the proposal (e.g., Sc & Sp) be found. Which means if the cluster fails and needs to be restarted, since the first local registry file includes both the Sc and Sp, and no other persistent storage locations of the plurality of persistent storage locations have the Sp, mastership is still maintained by first node (e.g., the current master node). In some embodiments, the request to update the first local registry file is made by the second node (e.g., second node 110b), but the actual processing of updating the first local registry file is handled by the first node since the first local registry file is not network accessible by the second node 110b.

At 320, the first voting file 150a on the first local storage 120a is updated to include the proposed sequence number Sp as well as the current sequence number Sc (e.g., the proposal). In some embodiments, the second node performs the update to include the proposed sequence number Sp into the first local storage. At this point in the re-mastering process, if the master node fails, the re-mastering process fails, or the entire cluster fails, the first node may still be determined to be the master node.

At 330, the second voting file 150b on the second local storage 120b is updated to include the proposed sequence number Sp as well as the current sequence number Sc (e.g., the proposal). In some embodiments, the second node performs the update of including the proposed sequence number Sp into the first local storage. At this point in the re-mastering process, if the master node fails, the re-mastering process fails, or the entire cluster fails, the first node may still be determined to be the master node because the second node does not yet have a committed sequence number in the local registry file 140b located on the second node. However, there are some situations where the first node may think the second node may be the new master, but the first node may wait for a disk timeout period before concluding that the first node is still the master. A disk timeout period is the amount of time which a particular node would perceive another node to be dead based on heartbeat information written by the other node in the voting file. The disk timeout period may be a preconfigured amount of time determined to provide adequate time for a miscommunication between two nodes to indicate a node failure. Further disclosures as to situations of when the first node may suspect it is still the master node, but must perform a few more checks/steps before concluding that the first node is still the master node, are discussed below.

At 340, the proposed sequence number Sp is added to the local registry file 140b on the second node 110b as a committed sequence number. As discussed above, before adding the proposed sequence number Sp to the local registry file 140b, the local registry file does not have the currently committed sequence number Sc. In fact, this is the only persistent storage location of the plurality of storage locations used to monitor the re-mastering process that does not have the currently committed sequence number Sc during normal operation. This is because during a normal failure where no re-mastering is taking place, at restart of the nodes, the first thing the nodes 110 check is its respective local registry file 140. If there are no current sequence number Sc or proposed sequence number Sp in its local registry file, then the node may conclude that it is the non-master node and will not attempt to restart the cluster.

Instead, the non-master node will rejoin the cluster once the master node restarts the cluster. However, if the respective local registry file 140 has only a current sequence number Sc (i.e., no proposed sequence number Sp) then the respective node may conclude that the respective node is a master node, at which time, the respective node may restart the cluster so that the non-master node, when it is ready to join the cluster, may join the cluster.

Returning back to FIG. 2, at 250, a portion of the plurality of persistent storage locations are updated upon the completion of the transfer of mastership from the first node to the second node. The local registry file 140*a* is cleared of the proposal (e.g., the currently committed sequence number Sc and proposed sequence number Sp). Additionally, the first and second voting files (e.g., voting files 150*a* and 150*b*) are updated such that the currently committed sequence number is replaced with the proposed sequence number and the proposed sequence number is replaced with a value of "0" or null to indicate that the currently committed sequence number has a higher value than the proposed sequence number (which has a value of "0" or null) to indicate that no re-mastering process in currently in progress. In some embodiments, the clearing of the local registry file 140*a* and the update of both of the voting files 150*a* and 150*b* are performed in a single transaction to complete the last step of the re-mastering process.

At this point in the re-mastering process, if the master node fails, the re-mastering process fails, or the entire cluster fails, the re-mastering process is deemed to have been effectively completed such that mastership is successfully transferred from the first node 110*a* to the second node 110*b*. For example, once the local registry file 140*a* is cleared and the voting files are updated, there is no longer any question as to which of the two nodes is the master. If the first node fails and is restarted, the mastership manager 105*a* on the first node will check its local registry file 140*a* and determine that there are no sequence numbers in the local registry file. Next, the first node will check its voting file 150*a* to find that the currently committed sequence number has a value while the proposed sequence number has a value of "0" or null, which indicates no re-mastering process is in progress. Thus, the first node may conclude without doubt that the first node is not the master and that the other node (e.g., the second node) is the master node, and the first node is the non-master node. In some embodiments, the mastership manger 105*a* may simply conclude that node 110*a* is the non-master node simply from the fact that the local registry file 140*a* on the first node 110*a* does not have a committed sequence number and that the proposed sequence number has either a value of "0" or null.

FIGS. 4A-4G illustrate an example of transferring mastership from a first node to a second node in a two-node non-shared storage cluster, according to some embodiments of the present disclosure. FIGS. 4A-4G illustrates a system similar to the system of FIG. 1 disclosed above with the exception that local registry files 140 and voting files 150 show two storage location within their respective files for storing either a currently committed sequence number Sc or a proposed sequence number Sp. FIGS. 4A-4G illustrates, according to some embodiments of the present disclosure, a sequential set of steps (see FIG. 3) for tracking the state of the cluster during a transfer of mastership from a first node (node 110*a*) to a second node (node 110*b*). FIGS. 4A-4G will now be discussed with references made to steps from FIG. 3.

Figure 4A:
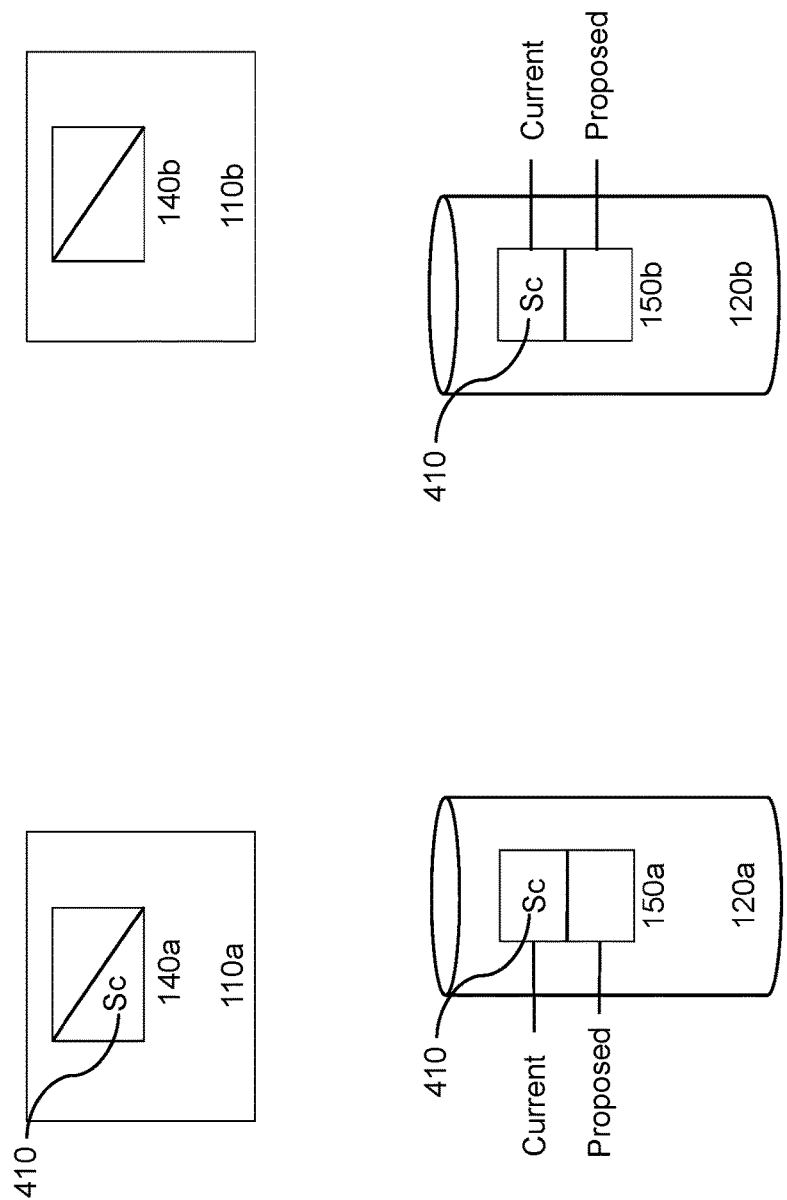
FIGS. 4A-4G illustrate an example of transferring mastership from a first node to a second node in a two-node non-shared storage cluster, according to some embodiments of the present disclosure.

FIG. 4A illustrates a two-node cluster system 400 under normal operating conditions where no re-mastering is currently in progress. This is evident by the currently committed sequence number 410, shown as Sc, being currently stored in the local registry file 140*a*, the first voting file 150*a*, and the second voting file 150*b*. Additionally, the second node registry file 140*b* does not contain any sequence numbers. Currently the master node is the first node 110*a*. This is determined by inspecting the four persistent storage locations (e.g., local registry files 140 and voting files 150). For example, a proposed sequence number is not currently stored in any of the four persistent storage locations. This is clear that a re-mastering has not yet been initiated, and thus node 110*a* is the master node. Additionally, node 110*b* is clearly a non-master node since the local registry file 140*b* does not contain any sequence number(s), indicating that node 110*a* should have at least a current sequence number 410.

Figure 4B:
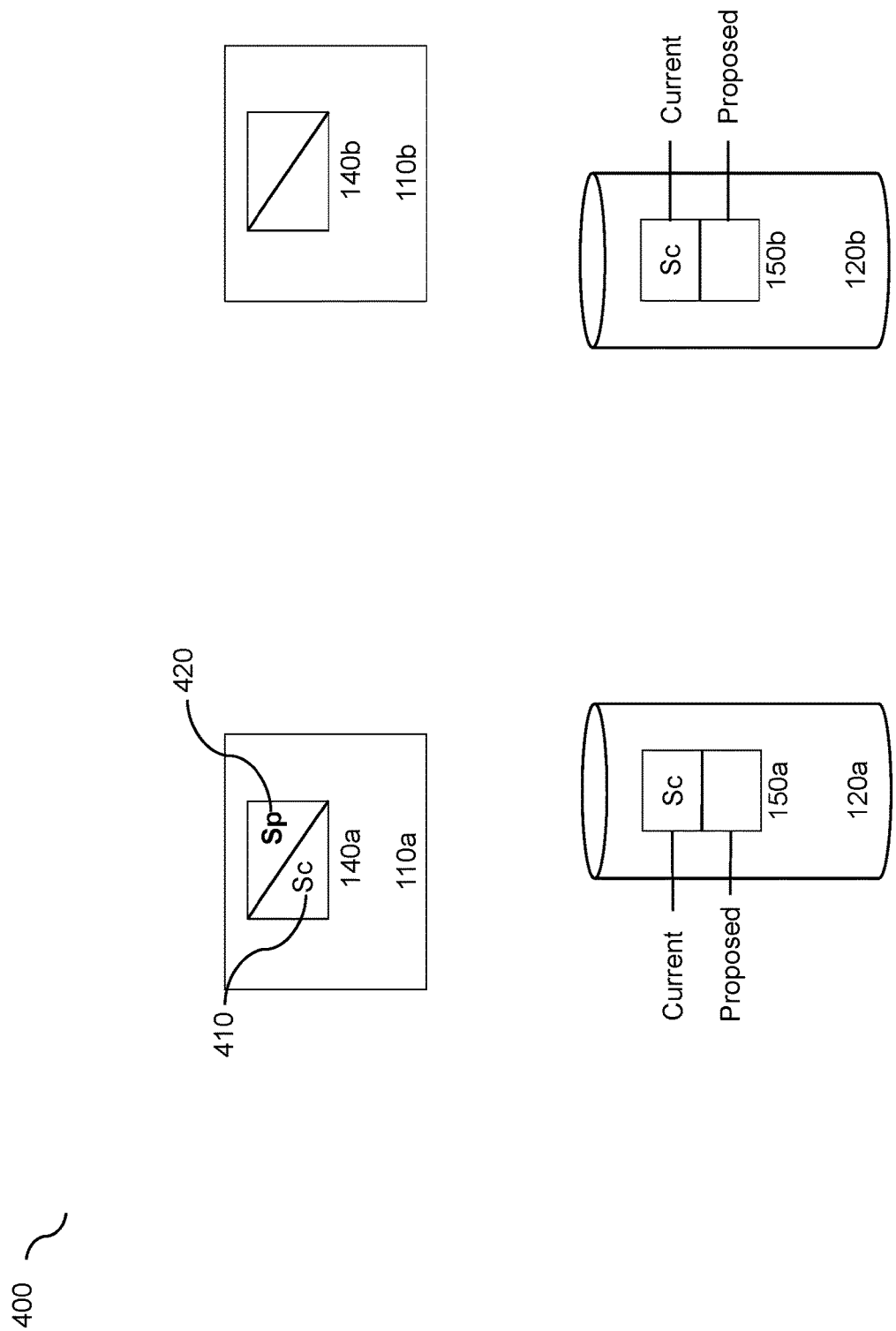

FIG. 4B illustrates the two-node cluster system 400 where a proposed sequence number 420, shown as Sp in the figures, is first entered into the local registry file 140*a* of the first node 110*a* (e.g., Step 310 from FIG. 3) to update the registry file 140*a* to include a proposal depicted as having both the current sequence number 410 and the proposed sequence number 420. As discussed above, the proposed sequence number 420 is a monotonically increasing number that is generated. Proposed sequence number 420 is a number larger than the current sequence number Sc currently stored in the registry file 140*a*.

The entry of the proposed sequence number 420 signals the initiation of a re-mastering process. Since node 110*a* is the current master, writing the proposed sequence number 420 into the local registry file 140*a* indicates that a re-mastering process is in progress. If the master node was to fail and had to restart at this point in time, the master node, upon restarting, would inspect the registry file 140*a* and determine that a re-mastering is in progress and that additional information may need to be checked to determine whether or not node 110*a* is still the current master or if mastership has already transferred to the second node 110*b*.

Figure 4C:
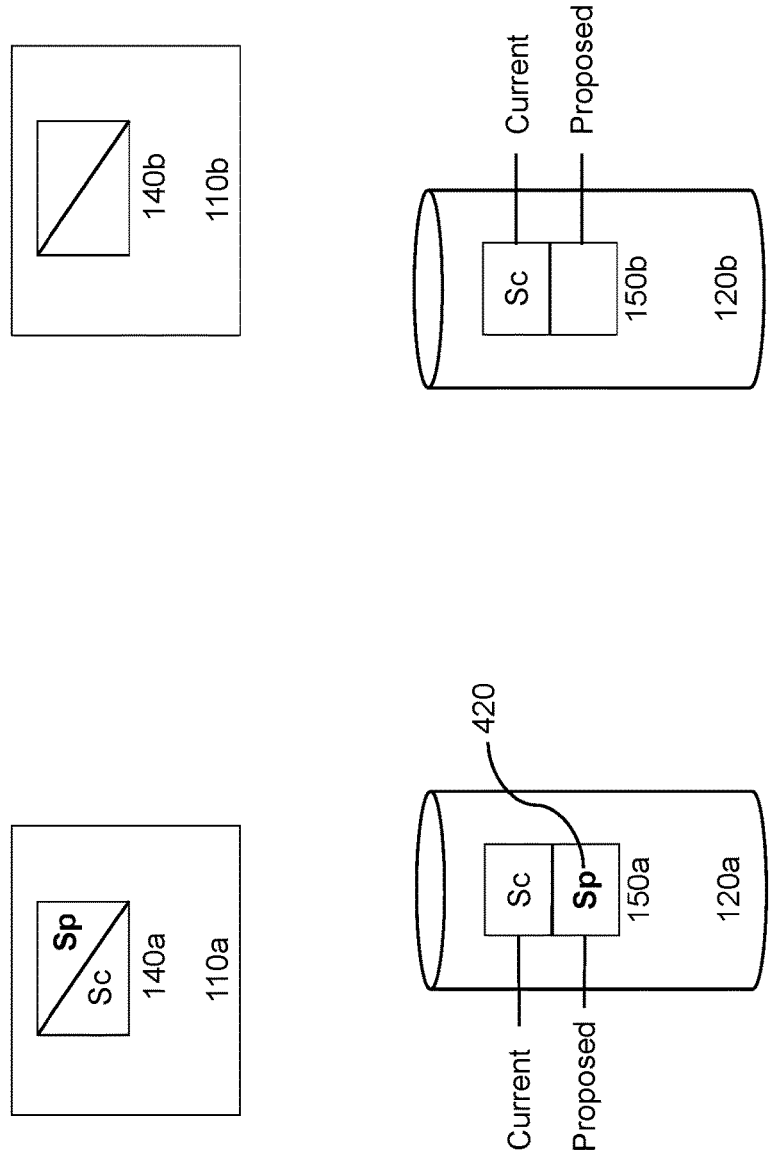
Figure 4D:
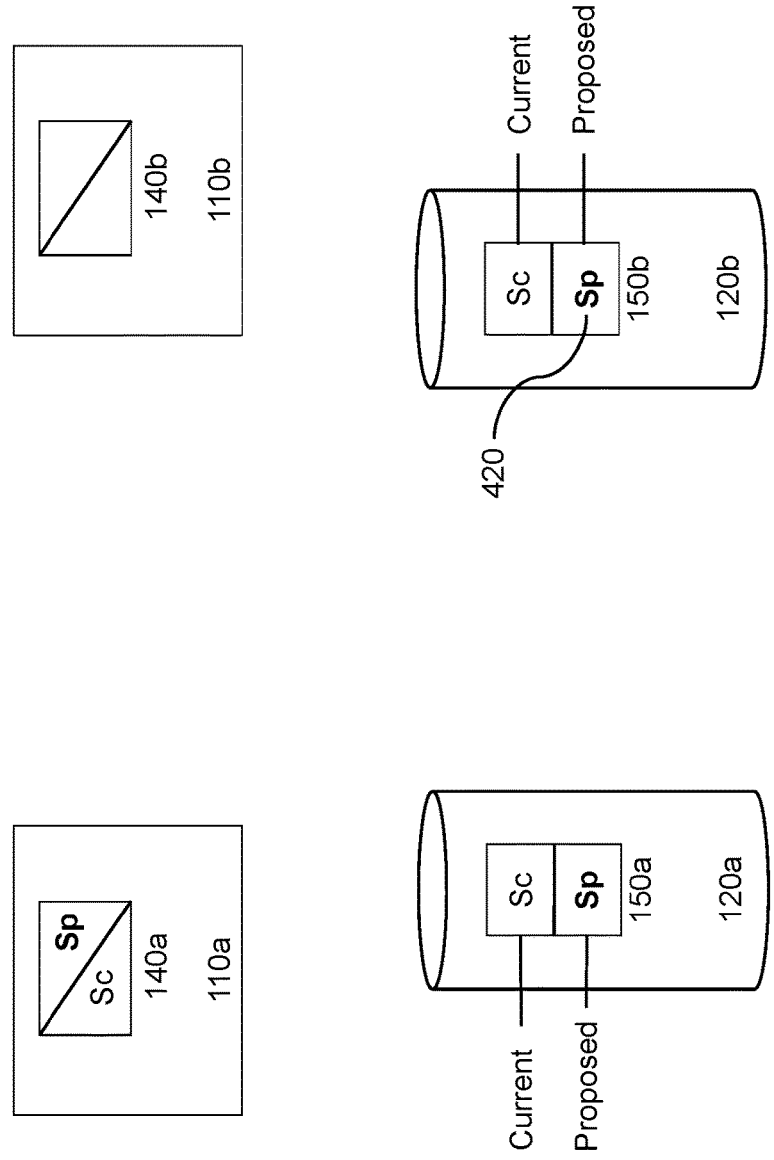

The proposed sequence number 420 is next written into the first voting file 150*a* to update the first voting file 150*a* (e.g., Step 320 from FIG. 3) to include the proposed sequence number 420, as depicted in FIG. 4C. The first voting file 150*a* now having a proposal comprising the current sequence number Sc and the proposed sequence number 420, shown as Sp in figures. Next, the proposed sequence number 420 is written into the second voting file 150*b* to update the second voting file 150*b* (e.g., Step 330 from FIG. 3) to include the proposed sequence number 420, as depicted in FIG. 4D. The second voting file 150*b* now having the proposal comprising the current sequence number Sc and the proposed sequence number 420, shown as Sp in the figures. At this point in time, the state of system 400 has the proposal sequence number 420 in the local registry file 140*a* and on both voting files 150 on both nodes.

Figure 4E:
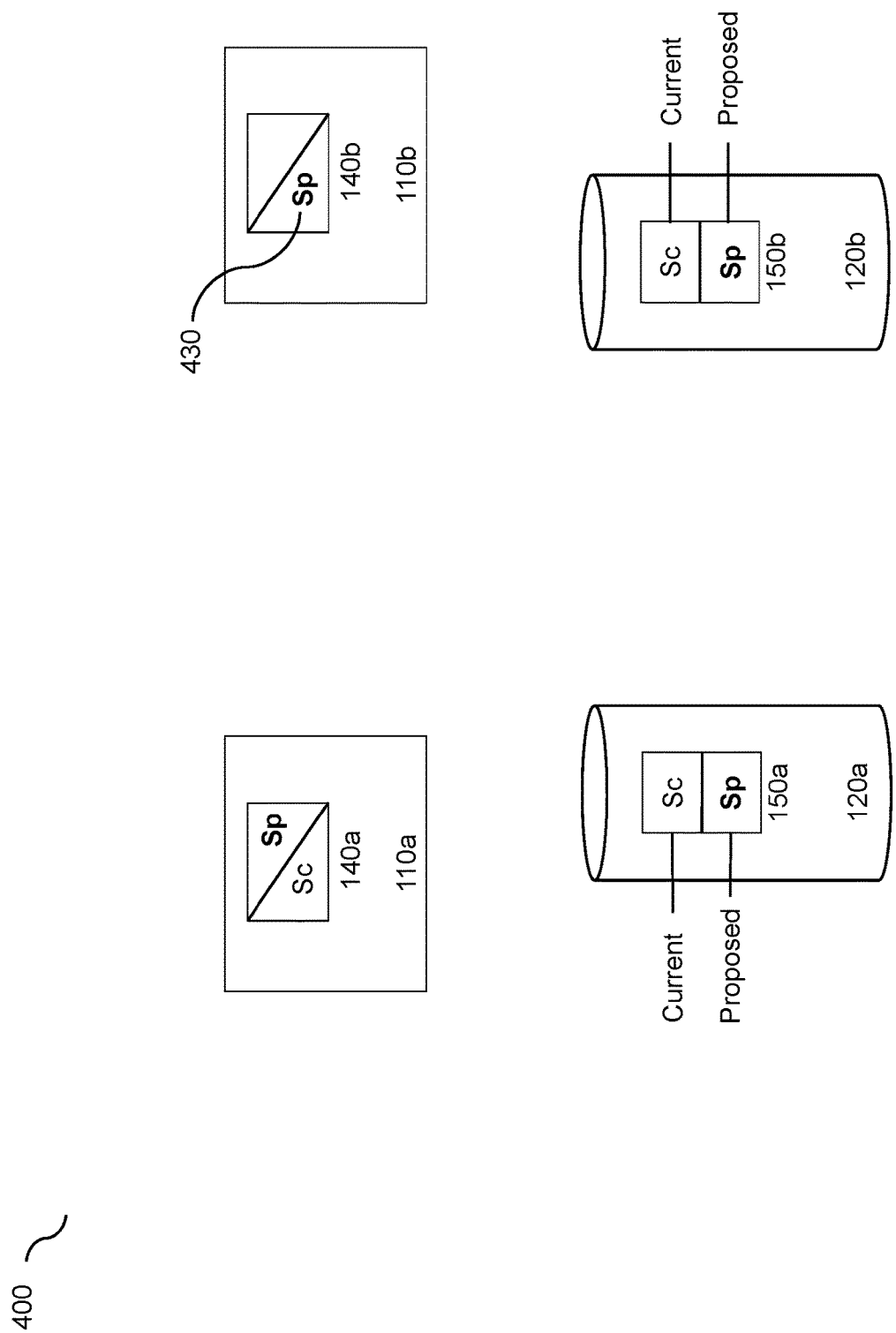

The proposed sequence number 420 from the previous steps is next written to the local registry file 140*b* (e.g., Step 340 from FIG. 3) as a committed sequence number 430, also shown as Sp, as depicted in FIG. 4E. The local registry file 140*b* now has only the committed sequence number 430. Node 110*b* was originally the non-master node of the two-node cluster since node 110*a* was originally the master node. The non-master node of the two-node cluster does not have any sequence number in its local registry file 140, as depicted in FIG. 4A-4D. Now, non-master node 110*b* has the proposed sequence number 420 written in its local registry file 140b as committed sequence number 430. Committed sequence number 430 is significant because when the second node 110b restarts and inspects its local registry file 140b, it will notice that there is a committed sequence number 430 stored within the local registry file 140b, indicating that the second node 110b is the master node of the two-node cluster.

Figure 4F:
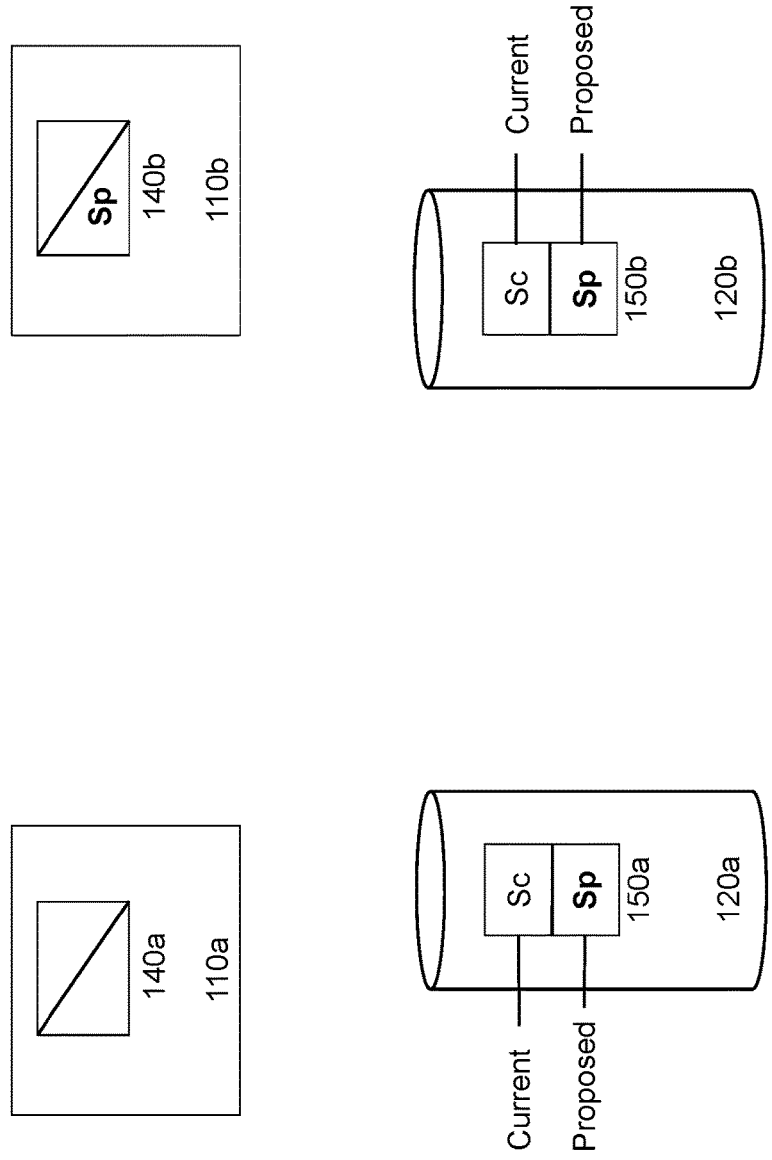
Figure 4G:
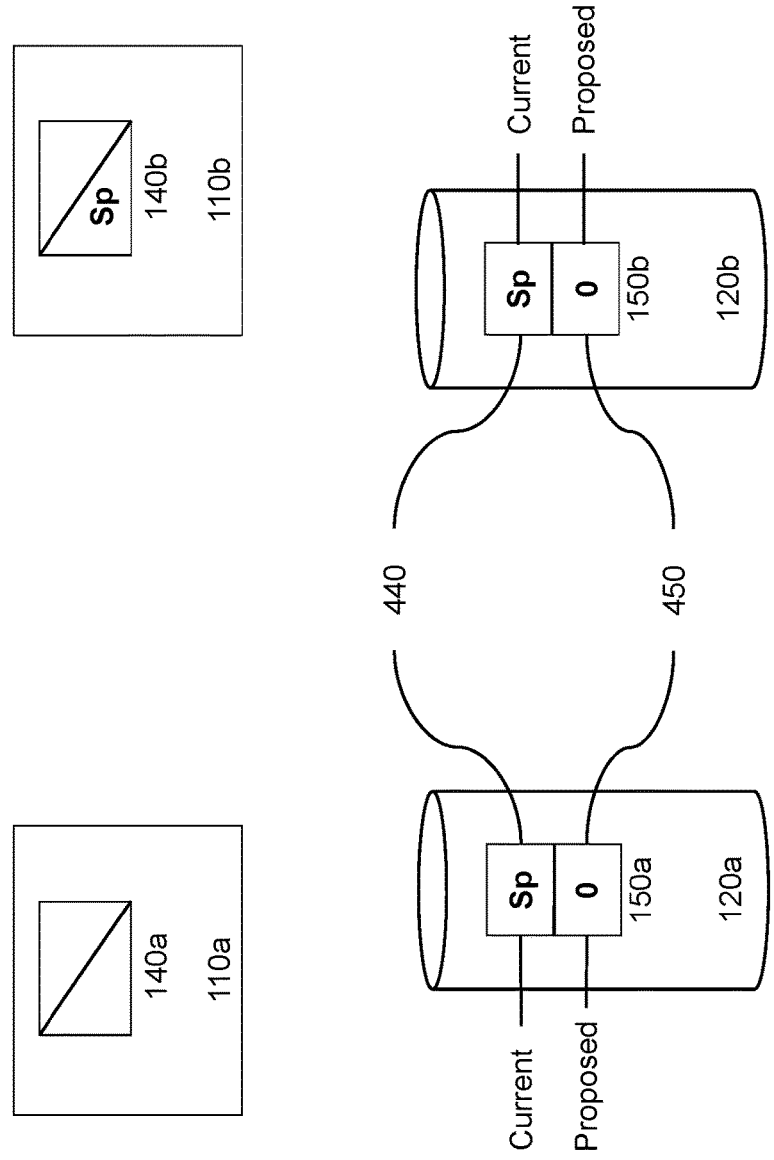

Next, the currently committed sequence number Sc and the proposed sequence number Sp are both removed/deleted/cleared from the local registry file 140a (e.g., Step 250 from FIG. 2), as depicted in FIG. 4F. The local registry file 140a now has no sequence numbers, thus indicating that the node 110a is now the non-master node in the two-node cluster. Next, the first and second voting files are updated such that the currently committed sequence number is replaced with the proposed sequence number (e.g., Step 250 from FIG. 2), as depicted as 440 in FIG. 4G and the proposed sequence number is replaced with a value of "0", as depicted as 450 in FIG. 4G to indicate that the currently committed sequence number has a higher value than the proposed sequence number (which has a value of "0") to indicate that there is no re-mastering process in progress. Updating the currently committed sequence number with the proposed number and updating the proposed sequence number with a value of "0" is to avoid monotonically increasing pending sequence numbers.

The merit of having a proposal (e.g., Sc and Sp) is to give the old master a chance to form the cluster if re-mastering fails. Once, the local registry file 140a of the old master (e.g., node 110a) clears the proposal (Sc/Sp), the old master (e.g., node 110a) can no longer become a master. Beyond this point only one node (e.g., the new master node 110b) can form the cluster. The old master would renounce the mastership by setting the current sequence number to the proposed sequence number and setting the propose sequence number to a value of "0" on both the voting files 150a and 150b. In some embodiments, the clearing of the first local registry file and the update of both of the voting files are performed in a single transaction step to commit the proposed sequence number to be the new current sequence number.

Failure Scenarios During Re-Mastering

The following scenarios assume that the re-mastering failed causing both of the nodes (e.g., node 110a and node 110b) to go down and the two nodes start up at some point in time thereafter. The following scenarios also revolve around a strict assumption that a non-master node cannot have a proposal (Sc/Sp) in its local registry file 140 and would only have the proposed sequence number. All steps are causal and if one fails all future steps fail. The causality is vital and it leads to deterministic recovery. For simplicity of explanation, node 110a will be referred to hereinafter as "node 1", node 110b will be referred to hereinafter as "node 2", the current sequence number 410 will be referred to hereinafter as "Sc", the proposed sequence number 420 will be referred to hereinafter as "Sp", and the value stored in one of the plurality of persistent storage location for managing the re-mastering process as a combination of the Sc and Sp will be referred to hereinafter as a "proposal".

All of the Nodes Fail after Completing Step 330 but Before Completing Steps 340 and 250:

The state of the two-node cluster is: a proposal is in the local registry file 140a of node 1 and both voting files 150 on node 1 and node 2. Node 1 is still the master node, but node 1 does not know that it is still the master node.

Situation A:

When node 1 is restarted, node 1 will wait for a disk timeout to make sure the other node (e.g., node 2) has not yet formed the cluster. After the disk timeout period has expired, indicating that node 2 is not the master because if node 2 was the master, node 2 would have restarted the cluster within the disk timeout period and sent out heartbeats to node 1. At this point, since node 2 did not form the cluster within the disk timeout period, node 1 will assume that node 1 is the still the master and node 1 will re-key and form the cluster. Re-keying is further disclosed below. If only one of the voting files 150 is accessible (e.g., voting file 150a on node 1 is accessible and voting file 150b is not available because node 2 is down but may be rebooting), node 1 should not form the cluster. Node 1 should instead wait to join the other node, or discover the other voting file 150b because the other node (e.g., node 2 would reboot on failure) has not yet rebooted.

For example, there are four persistent storage locations tracking the mastership state management of the cluster (e.g., voting files 150a, voting files 150b, local registry file 140a, and local registry file 140b). Node 1, upon restart, will need to have access to three of the four persistent storage locations to be able to make a quorum like determination to know for sure whether it is the master node or the other node is the master node. Since node 1 only has access to only one voting file 150a and not the other voting file 150b because node 2 may be down, node 1 cannot establish a quorum because node 1 has, at most, access to only two of the four persistent storage locations—thus node 1 does not have access to at least three of the four persistent storage location information to determine whether it is the master node or not the master node. This is to ensure that node 2 did not already form the cluster and continue processing, which is why node 1 needs access to both of the voting files (e.g., voting files 150a and 150b) to make the determination. Therefore, if node 1 only has access to its own voting file 150a and not to voting file 150b from node 2, then node 1 will have to wait until node 2 is restarted such that node 1 may access voting file 150b on node 2 to complete its determination of whether or not node 1 is the master node.

Situation B:

Node 2 reboots upon failure and determines that it does not have a proposal in its registry file 140b. Node 2 would then wait for node 1 to form the cluster and then join the cluster because node 2 would know that it is the non-master node. Additionally, node 2 must not send heartbeats to node 1 so that node 1 may go ahead and form the cluster after the disk timeout period has expired. A heartbeat sent from node 2 to node 1 would result in both the nodes waiting for each other because node 1, as discussed above in Situation A, upon receiving a heartbeat from node 2, node 1 would assume that node 2 is the master node and thus node 1 would wait for node 2 to restart the cluster so node 1 may join it. After joining the cluster formed by node 1, the local storages 120 would sync up and the cluster reconfiguration may be complete. If node 2 comes up and node 1 never comes up, node 2 should not be allowed to form the cluster since node 2 is the non-master node. A manual human intervention may be required to restart the two-node cluster.

All of the Nodes Fail after Completing Step 340 but Before Step 250:

The state of the two-node cluster is: a proposal is in the local registry file 140a of node 1 and both voting files 150 on node 1 and node 2. A new sequence number (e.g., the proposed sequence number Sp) is stored in the local registry file 140b. Node 2 is the new master.

Situation A:

With respect to node 1 restarting, the same Situation A above applies.

Situation B:

There are two possible scenarios: (I) node 2 starts up and heartbeats within the disk timeout of node 1 (e.g., from when node 1 starts counting its disk timeout period). In this case, node 2 will form the cluster and node 1 will join the cluster formed by node 2. (II) If node 2 never starts up or node 2 starts up after the disk timeout period expired for node 1, two outcomes may apply: (a) if node 2 starts after node 1 has re-keyed, which means node 1 will continue to be the master and restarts the cluster, this is okay since node 2 does not have a majority match of its new sequence number of Sp in its local registry file 140*b* since the other three persistent storage location does not have the new sequence number of Sp (e.g., the local registry file 140*a* of node 1 and both voting files 150 on node 1 and node 2 have the proposal stored (e.g., Sc and Sp, not just Sp). (b) if node 1 has not yet re-keyed, node 2 would be given the go ahead to form the cluster because node 1 would have detected the heartbeats from node 2, clear its local registry file 140*a* and restart as a non-master.

For example, this failure scenario may be explained with reference to FIG. 4E, where the proposed sequence Sp is already written into the local registry file 140*b* of node 2. During this period where the cluster is down and the two nodes are restarting, node 1 may think that it is the master because inspecting its local registry file 140*a* and voting file 150*a*, node 1 will see both a proposed sequence number Sp and a current sequence number Sc stored at both persistent storage locations. However, node 1 will wait until a timeout period expires to allow node 2 the opportunity to restart and perhaps form the cluster, if node 2 is the master node. Assuming node 2 starts up and determines that node 2 is the master node (e.g., by inspecting its local registry file and seeing only a proposed sequence number Sp), node 2 will then go ahead and restart the cluster and heartbeat to node 1, at which point node 1 will simply join the cluster. However, if after the timeout period expires and node 2 has not yet restarted, then node 1 will attempt to restart the cluster and start the re-key process to make sure that when node 2 eventually restarts, node 2 will not try to restart the cluster since the data stored in its local registry file 140*b* will be blank and the information stored in its local voting file 150*b* will only contain a current sequence number Sc (e.g., see FIG. 4A which shows the state of the system immediately after a rekey by node 1 (e.g., node 110*a*).

All of the Nodes Fail after Completing Step 250:

The state of the two-node cluster is: the local registry file 140*a* of node 1 is cleared, the Sp is stored as the new current sequence number Sc in the local registry file 140*b* of node 2 and Sp is stored as 0/null in both voting files 150 on node 1 and node 2.

Node 1 is the non-master node and node 2 is the new master node at this point. Only node 2 can form the cluster.

Recovery and Re-Keying:

Re-keying is resetting the state management process once a master node has been definitively defined so the state management process may be re-initialized for the next re-mastering request. All failure scenarios disclosed above will leave behind an unfinished proposal to be addressed upon cluster restart. This is termed as recovery. Recovery includes choosing a master as disclosed in this disclosure and re-keying the voting files 150*a* and 150*b* and the master node's local registry file 140 to confirm the proposed sequence number as the new current sequence number Sc.

After the master node is determined, the master node will process the unfinished proposal as follows: (a) if the node with the proposal (Sc/Sp) in its local registry file 140 becomes the master (e.g., if node 1 is originally the master and during the re-mastering the cluster failed, then the local registry file 140*a* of node 1 is the only node with Sc/Sp in its local registry), it would rekey its local registry file 140 and both voting files 150 with a newly generated sequence number (i.e., not Sc nor Sp); (b) if the node with only Sp in its local registry file 140 becomes the new master (e.g., the non-master node would be the only node with only Sp in its local registry file 140—see Step 340 and FIG. 4E), then that node would commit Sp in at least its local voting file 150 and then attempt to commit Sp on both voting files 150; (c) the node would clear its respective local registry file 140 if it does not match the committed sequence number Sp (e.g., the node is the non-master node, wherein the non-master node has an empty local registry file 140 when the two-node cluster is in a normal operational state, not during a re-mastering process).

What has been disclosed is an approach for computing a quorum for a two-node non-shared converged storage architecture. This approach therefore enhances the efficiencies of computing a quorum in a two-node non-shared converged storage architecture without the need of an additional quorum device, structure, and/or tiebreaker to compute a quorum for the two-node cluster. This approach greatly improves the technical area of two-node cluster management via a distributed state machine of tracking the state of the cluster by writing to a plurality of persistent storage location in a particular way and/or a particular order.

System Architecture Overview

Figure 5:
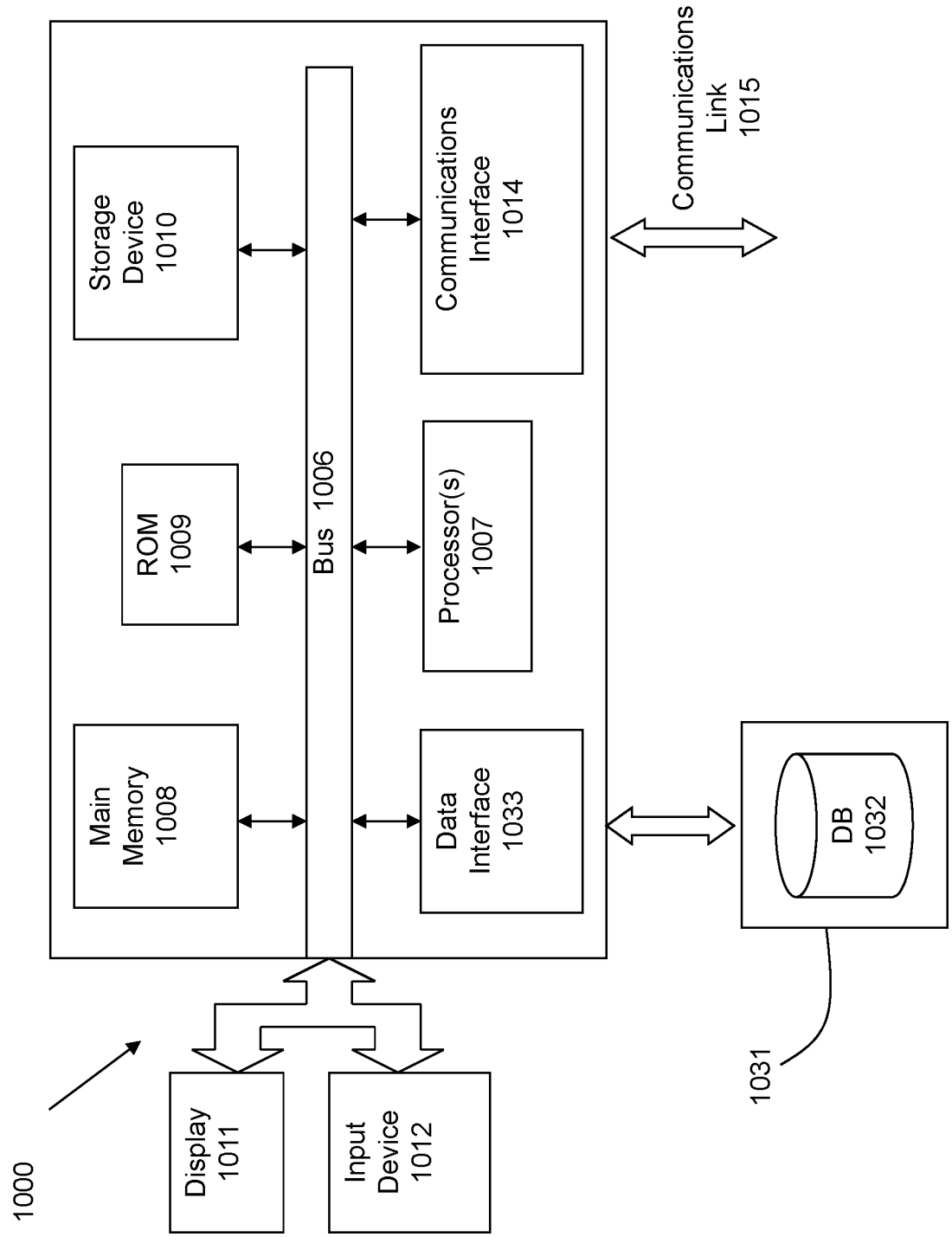
FIG. 5 is a block diagram of an illustrative computing system suitable for implementing an embodiment of the present disclosure.

FIG. 5 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 6:
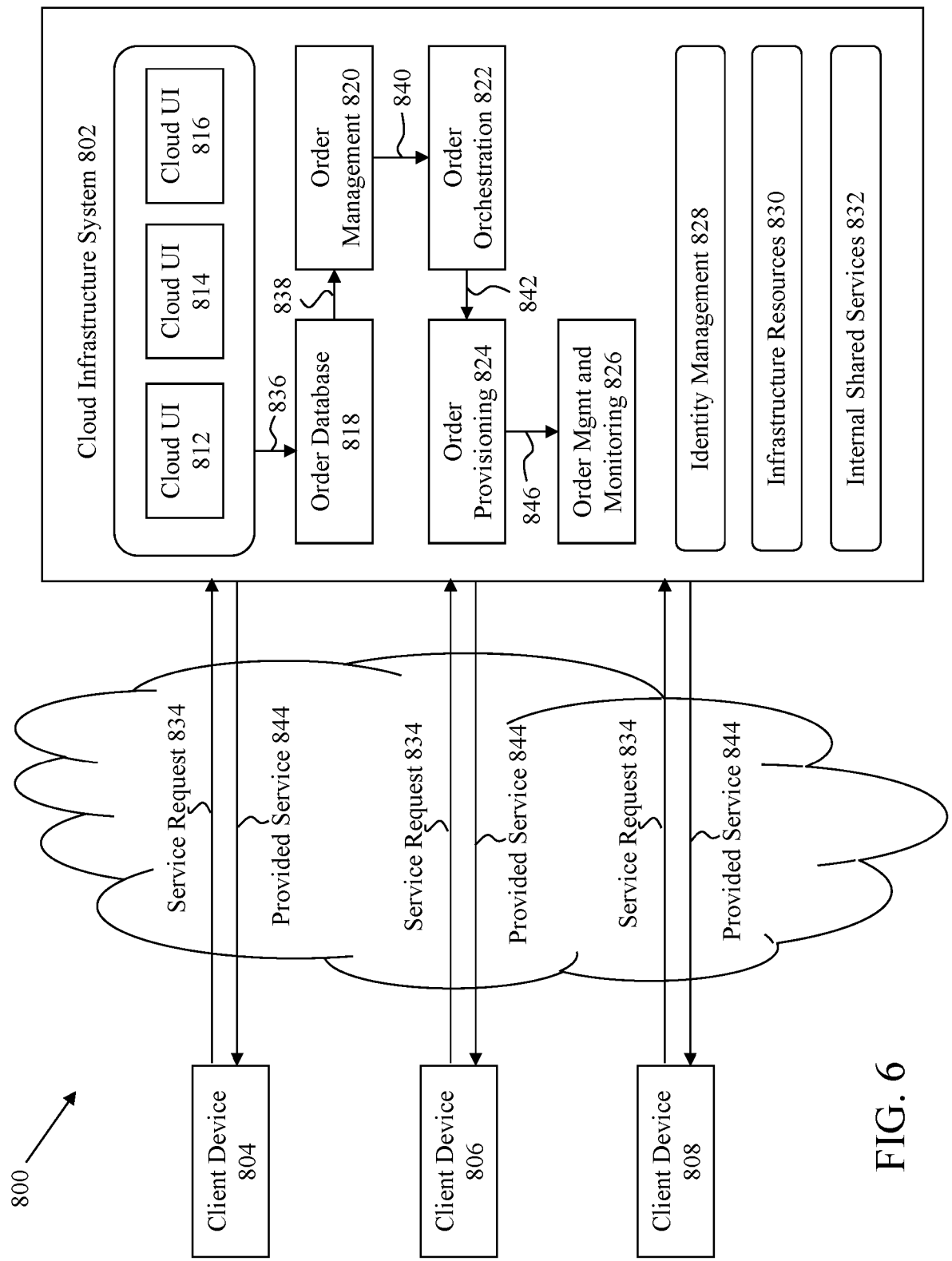
FIG. 6 is a block diagram of one or more components of a system environment by which services provided by one or more components of an embodiment system may be offered as cloud services, in accordance with an embodiment of the present disclosure.

FIG. 6 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method for transferring mastership of a first node to a second node in a two node non-shared storage cluster, the method comprising:
   initiating a transfer of mastership from a first node to a second node in a two node non-shared storage cluster at least by generating a proposed sequence number, wherein
      the two node non-shared storage comprises a first node and a second node, the first node comprises a first local storage that is accessible by the second node only via the first node, and the second node comprises a second local storage that is accessible by the first node only via the second node;
   writing the proposed sequence number to a plurality of persistent storage locations as a sequence number, the plurality of persistent storage locations comprising:
      a first local registry on the first node,
      a second local registry on the second node,
      a first data on a first local storage of the first node, and
      a second data on a second local storage of the second node; and
   updating a portion of the plurality of persistent storage locations upon completion of the transfer.

2. The method of claim 1, further comprising determining, by the second node, after the completion of the transfer that the second node is a master node by:
   identifying a first sequence number stored in the second local registry on the second node, the first sequence number being a single sequence number stored in the second local registry, and
   identifying a second sequence number stored in the second data on the second local storage of the second node, the second data indicated as a current sequence number, wherein the first sequence number and the second sequence number are a same sequence number, the second sequence number being the proposed sequence number stored in the second local registry.

3. The method of claim 1, wherein the writing of the proposed sequence number to the plurality of persistent storage locations is performed in a particular order, the particular order comprising:
   updating the first local registry to include the proposed sequence number;
   updating the first data on the first local storage of the first node to include the proposed sequence number;
   updating the second data on the second local storage with the proposed sequence number; and
   adding the proposed sequence number to the second local registry on the second node, the second local registry comprising only the proposed sequence number.

4. The method of claim 1, wherein the updating of the portion of the plurality of persistent storage locations comprises:
   clearing the first local registry;
   updating a first current state field with the generated sequence number and a first proposed state field with a blank on the first data; and
   updating a second current state field with the generated sequence number and a second proposed state field with a blank on the second block of data.

5. The method of claim 1, wherein the first node, before the initiating of the transfer, is a master node as indicated by:
   the second local registry being empty, and
   the first local registry, the first block of data, and the second block of data each comprising only a current sequence number.

6. The method of claim 1, wherein the sequence number generated is a proposed sequence number indicating a start of a state transition.

7. The method of claim 1, wherein the master node initiates the transfer of the mastership.

8. The method of claim 7, wherein the transfer is initiated as a result of the master node determining that the master node is failing.

9. The method of claim 1, wherein a non-master node initiates the transfer of the mastership, wherein the transfer is initiated as a result of the non-master node determining that the master node is failing.

10. A system for transferring mastership of a first node to a second node in a two node non-shared storage cluster, comprising:
   a processor; and
   a memory for holding programmable code, wherein the programmable code includes instructions for:
   initiating a transfer of mastership from a first node to a second node in a two node non-shared storage cluster by generating a proposed sequence number, wherein
      the two node non-shared storage comprises a first node and a second node, the first node comprises a first local storage that is accessible by the second node only via the first node, and the second node comprises a second local storage that is accessible by the first node only via the second node,
   writing the proposed sequence number to a plurality of persistent storage locations as a sequence number, the plurality of persistent storage locations comprising:
      a first local registry on the first node,
      a second local registry on the second node,
      a first data on a first local storage of the first node, and
      a second data on a second local storage of the second node, and
   updating a portion of the plurality of persistent storage locations upon completion of the transfer.

11. The system of claim 10, wherein the programmable code includes further instructions for determining, by the second node, after the completion of the transfer that the second node is a master node by: identifying a first sequence number stored in the second local registry on the second node, the first sequence number being a single sequence number stored in the second local registry, and identifying a second sequence number stored in the second data on the second local storage of the second node, the second data indicated as a current sequence number, wherein the first sequence number and the second sequence number are a same sequence number, the second sequence number being the proposed sequence number stored in the second local registry.

12. The system of claim 10, wherein the writing of the proposed sequence number to the plurality of persistent storage locations is performed in a particular order, the particular order comprising:
   updating the first local registry to include the proposed sequence number;
   updating the first data on the first local storage of the first node to include the proposed sequence number;
   updating the second data on the second local storage with the proposed sequence number; and
   adding the proposed sequence number to the second local registry on the second node, the second local registry comprising only the proposed sequence number.

13. The system of claim 10, wherein the updating of the portion of the plurality of persistent storage locations comprises:
   clearing the first local registry;
   updating a first current state field with the generated sequence number and a first proposed state field with a blank on the first block of data; and
   updating a second current state field with the generated sequence number and a second proposed state field with a blank on the second block of data.

14. The system of claim 10, wherein the first node, before the initiating of the transfer, is a master node as indicated by:
   the second local registry being empty, and
   the first local registry, the first block of data, and the second block of data each comprising only a current sequence number.

15. The system of claim 10, wherein the sequence number generated is a proposed sequence number indicating a start of a state transition.

16. The system of claim 10, wherein the master node initiates the transfer of the mastership.

17. The system of claim 16, wherein the transfer is initiated as a result of the master node determining that the master node is failing.

18. The system of claim 10, wherein a non-master node initiates the transfer of the mastership, wherein the transfer is initiated as a result of the non-master node determining that the master node is failing.

19. A computer program product embodied on a non-transitory computer readable medium having stored thereon a sequence of instructions which, when executed by a processor causes the processor to execute a set of acts for transferring mastership of a first node to a second node in a two node non-shared storage cluster, the set of acts comprising:
   initiating a transfer of mastership from a first node to a second node in a two node non-shared storage cluster at least by generating a proposed sequence number, wherein
      the two node non-shared storage comprises a first node and a second node, the first node comprises a first local storage that is accessible by the second node only via the first node, and the second node comprises a second local storage that is accessible by the first node only via the second node;
   writing the proposed sequence number to a plurality of persistent storage locations, the plurality of persistent storage locations comprising:
      a first local registry on the first node,
      a second local registry on the second node,
      a first data on a first local storage of the first node, and
      a second data on a second local storage of the second node; and
   updating a portion of the plurality of persistent storage locations upon completion of the transfer.

20. The computer program product of claim 19, wherein the method further comprises determining, by the second node, after the completion of the transfer that the second node is a master node by:
   identifying a first sequence number stored in the second local registry on the second node, the first sequence number being a single sequence number stored in the second local registry, and
   identifying a second sequence number stored in the second data on the second local storage of the second node, the second data indicated as a current sequence number, wherein the first sequence number and the second sequence number are a same sequence number, the second sequence number being the proposed sequence number stored in the second local registry.

21. The computer program product of claim 19, wherein the writing of the proposed sequence number to the plurality of persistent storage locations is performed in a particular order, the particular order comprising:
- updating the first local registry to include the proposed sequence number;
- updating the first data on the first local storage of the first node to include the proposed sequence number;
- updating the second data on the second local storage with the proposed sequence number; and
- adding the proposed sequence number to the second local registry on the second node, the second local registry comprising only the proposed sequence number.

22. The computer program product of claim 19, wherein the updating of the portion of the plurality of persistent storage locations comprises:
- clearing the first local registry;
- updating, by the first node, a first current state field with the generated sequence number and a first proposed state field with a blank on the first block of data
- updating, by the first node, a second current state field with the generated sequence number and a second proposed state field with a blank on the second block of data.

23. The computer program product of claim 19, wherein the first node, before the initiating of the transfer, is a master node as indicated by:
- the second local registry being empty, and
- the first local registry, the first block of data, and the second block of data each comprising only a current sequence number.

24. The computer program product of claim 19, wherein the sequence number generated is a proposed sequence number indicating a start of a state transition.

25. The computer program product of claim 19, wherein the master node initiates the transfer of the mastership.

26. The computer program product of claim 25, wherein the transfer is initiated as a result of the master node determining that the master node is failing.

27. The computer program product of claim 19, wherein a non-master node initiates the transfer of the mastership, wherein the transfer is initiated as a result of the non-master node determining that the master node is failing.

* * * * *